United States Patent
Attard

(10) Patent No.: US 6,990,875 B2
(45) Date of Patent: Jan. 31, 2006

(54) PEDAL SUPPORT WITH COUPLED FUNCTIONS

(75) Inventor: Jean-Marc Attard, Villers sous Saint Leu (FR)

(73) Assignee: Robert Bosch Corporation, Stuttgart (DE)

(*) Notice: Subject to any disclaimer, the term of this patent is extended or adjusted under 35 U.S.C. 154(b) by 144 days.

(21) Appl. No.: 10/486,437

(22) PCT Filed: Jul. 30, 2002

(86) PCT No.: PCT/FR02/02728

§ 371 (c)(1),
(2), (4) Date: Mar. 1, 2004

(87) PCT Pub. No.: WO03/014857

PCT Pub. Date: Feb. 20, 2003

(65) Prior Publication Data

US 2004/0182193 A1 Sep. 23, 2004

(30) Foreign Application Priority Data

Aug. 8, 2001 (FR) .................................. 01 10621

(51) Int. Cl.
G05G 1/14 (2006.01)
(52) U.S. Cl. .................. 74/560; 74/512; 74/562.5; 477/172; 477/199; 477/211; 477/215; 180/334; 180/90.6

(58) Field of Classification Search ................ 180/334, 180/90.6; 74/512, 483 R, 473.17, 478, 478.5, 74/513, 514, 560, 561, 562, 562.5, 526, 529, 74/515 R, 515 E; 477/199, 170, 171, 172, 477/173, 211, 215

See application file for complete search history.

(56) References Cited

U.S. PATENT DOCUMENTS

| 4,312,246 | A | * | 1/1982 | Barresi | ...................... 74/562.5 |
| 4,546,667 | A | * | 10/1985 | Bopst, III | .................... 74/526 |
| 6,173,625 | B1 | * | 1/2001 | McFarlane et al. | ........... 74/512 |

* cited by examiner

Primary Examiner—Charles A. Marmor
Assistant Examiner—Tara Bolton
(74) Attorney, Agent, or Firm—Leo H McCormick, II; Warren Comstock

(57) ABSTRACT

A pedal box for a motor vehicle, comprising clutch (1), brake (2), and accelerator (3) pedals that are mounted to respectively rotate about a corresponding pivots (X1, X2, X3) between a rest position and a position of maximum actuation after passing through a multitude of intermediate positions. A link (4) located between the accelerator pedal (3) and the brake pedal (2) places the brake pedal (2) in an intermediate position or a rest position depending on whether or not the accelerator pedal (3) is in a rest position.

4 Claims, 4 Drawing Sheets

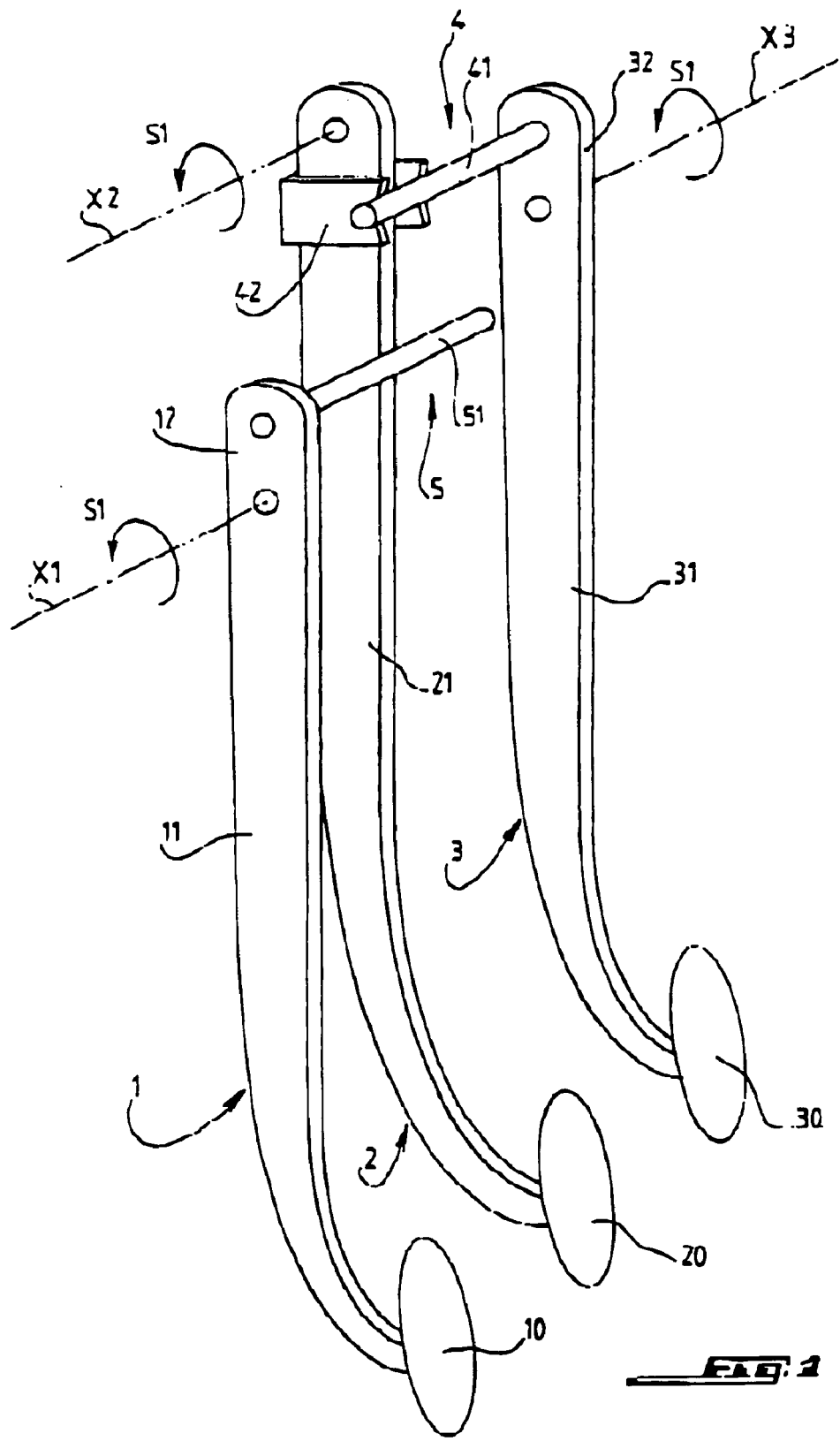

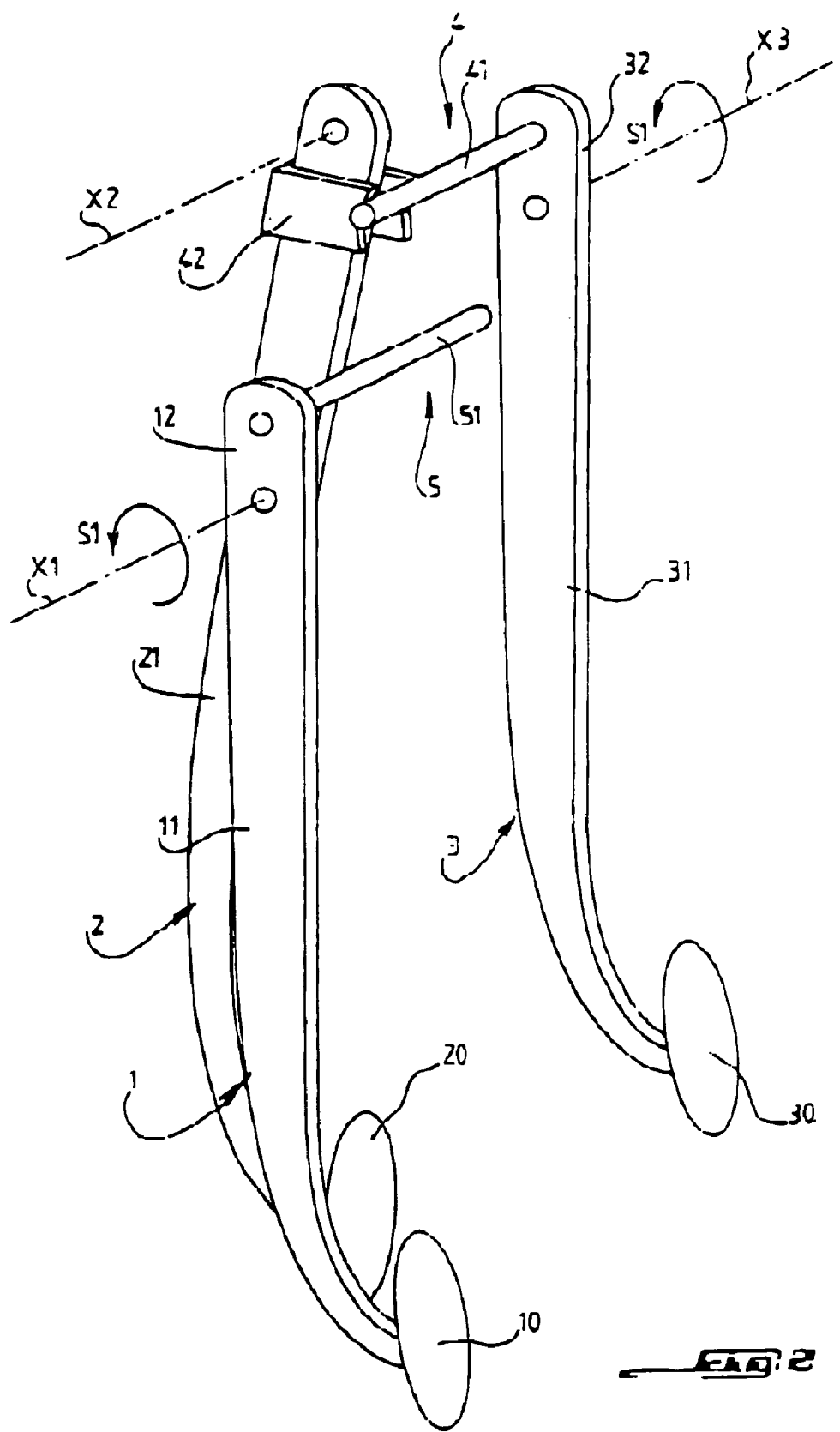

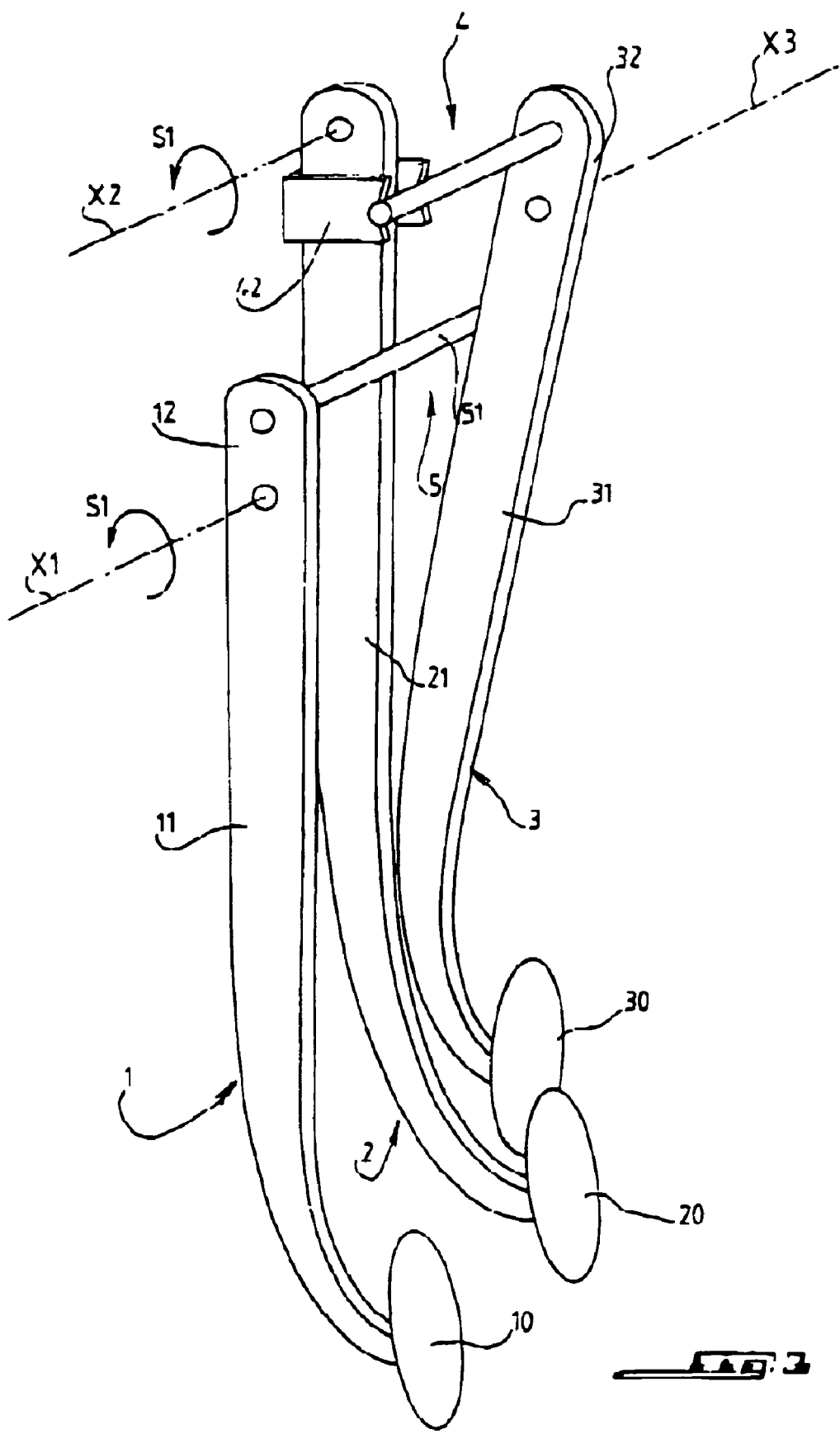

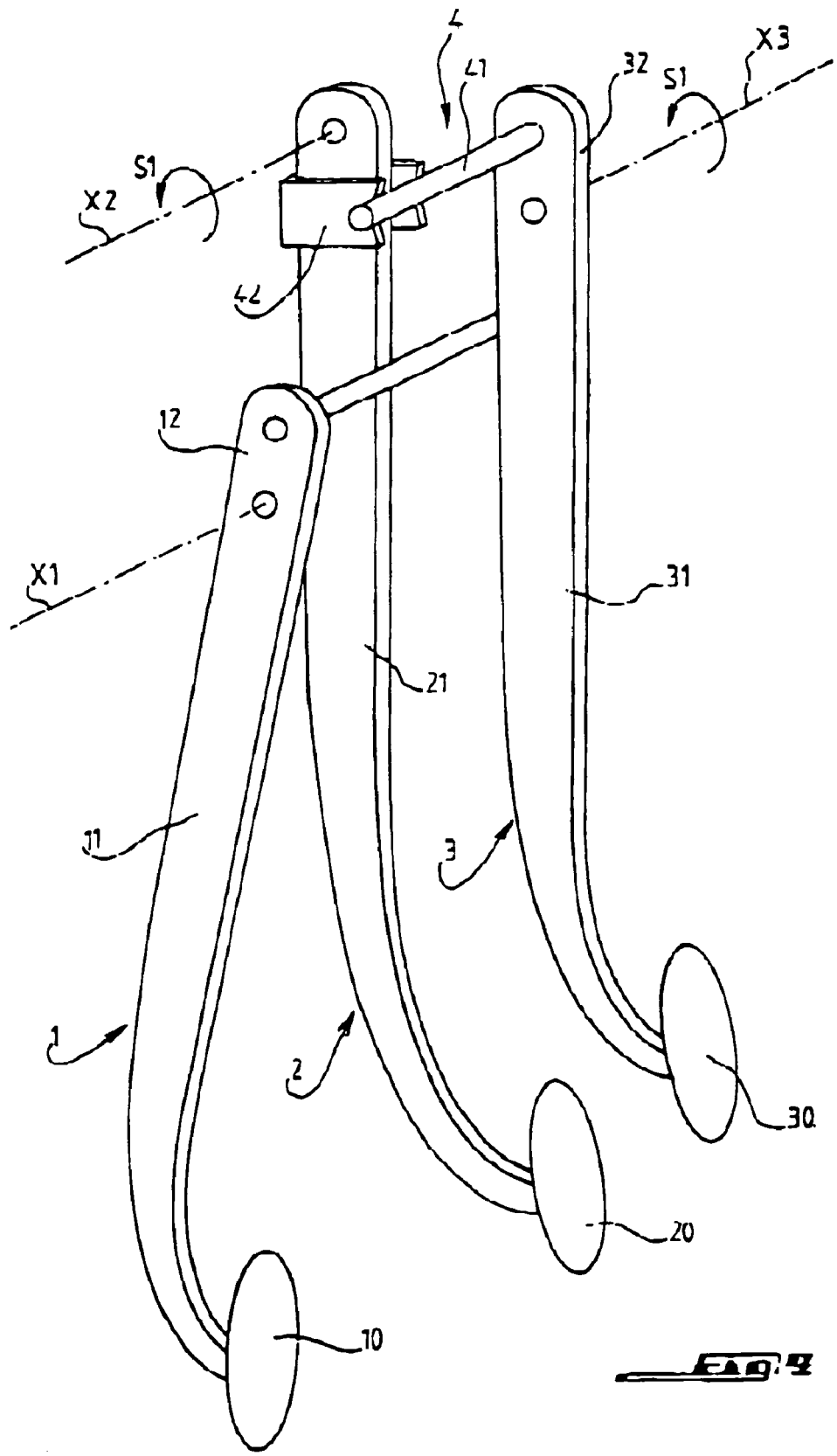

PEDAL SUPPORT WITH COUPLED FUNCTIONS

The present invention relates in general to motor vehicle braking systems.

More specifically, the invention relates to a pedal box for a motor vehicle, comprising a clutch pedal, a brake pedal and an accelerator pedal which are mounted to rotate about respective first, second and third pivots that are roughly parallel to one another, each pedal at each moment adopting either a rest position, or a position of maximum actuation, or an intermediate position somewhere between the rest position and the position of maximum actuation, and each pedal receiving an elastic torque directed in a first direction of rotation about its pivot and which urges it towards its rest position.

Pedal boxes conforming to this definition are known and have long been used entirely satisfactorily.

The invention, which is essentially a manifestation of the desire to improve the level of safety of motor vehicles, nonetheless relies on the discovery that conventional pedal boxes can be improved upon, and its purpose is to propose an improved pedal box that at least allows stopping distances to be shortened.

To this end, the pedal box according to the invention, in other respects in accordance with the generic definition given in the preamble hereinabove, is essentially characterized in that it comprises, between the accelerator pedal and the brake pedal, a first link which places the brake pedal in an intermediate position or in its rest position depending on whether or not the accelerator pedal is in its rest position.

By virtue of this arrangement, the brake pedal is immediately operational as soon as the accelerator pedal is released, all the parasitic play likely to delay braking being compensated for before the brake pedal is actuated through the release of the accelerator pedal.

It is possible, for example, to make provision for the brake pedal to comprise a lower lever arm extending between the second pivot and a brake pad, for the accelerator pedal to comprise lower and upper lever arms extending one on each side of the third pivot, the lower lever arm bearing an accelerator pad, and for the first link to comprise a first finger borne by the upper lever arm of the accelerator pedal, parallel to the third pivot, this first finger transmitting to the lower lever arm of the brake pedal a torque directed in the opposite direction to the first direction when the accelerator pedal is in its rest position.

This first link may also advantageously comprise a clevis mounted on the lower lever arm of the brake pedal and against which the first finger of the accelerator pedal rests when the accelerator pedal is in its rest position.

Still with a view to increasing driving safety, the pedal box of the invention may comprise, between the accelerator pedal and the clutch pedal, a second link which prevents the accelerator and clutch pedals from simultaneously adopting their respective positions of maximum actuation.

In this case, the clutch pedal comprises, for example, lower and upper lever arms extending one on each side of the first pivot, the lower lever arm bearing a clutch pad, and the second link comprises a second finger borne by the upper lever arm of the clutch pedal, parallel to the first pivot, this second finger transmitting to the lower lever arm of the accelerator pedal a torque directed in the first direction, at least when the clutch pedal reaches its position of maximum actuation when the accelerator pedal is not in its rest position.

Other features and advantages of the invention will become clearly apparent from the description thereof given hereinafter by way of nonlimiting indication, with reference to the appended drawings, in which:

FIG. 1 is a partial perspective view of a pedal box according to the invention, depicted at rest;

FIG. 2 is a partial perspective view a pedal box according to the invention, depicted during a braking phase;

FIG. 3 is a partial perspective view of a pedal box according to the invention, depicted in an accelerating phase; and FIG. 4 is a partial perspective view of a pedal box according to the invention, depicted in a phase of operating the clutch.

As mentioned previously, the invention relates to a pedal box for a motor vehicle.

In the traditional way, this pedal box comprises a clutch pedal 1, a brake pedal 2, and an accelerator pedal 3, these pedals being mounted so that they can rotate about respective pivots X1, X2 and X3 which are more or less mutually parallel.

Each of the pedals 1 to 3 is associated with a corresponding spring (not depicted), which applies to this pedal an elastic return torque directed in a direction of rotation S1 about its pivot, and which thus urges its towards its rest position illustrated in FIG. 1.

Each of the pedals 1 to 3 may also be moved from its rest position by the application of a force exerted by the driver of the vehicle on a corresponding pad, such as 10, 20 or 30, borne by a lower lever arm 11, 21 or 31 of this pedal.

At any moment, each of the pedals 1 to 3 therefore adopts either a rest position or position of maximum actuation or an intermediate position somewhere between the rest position and the position of maximum actuation.

According to the invention, the pedal box comprises, between the accelerator pedal 3 and the brake pedal 2, a link 4 which places the brake pedal 2 in an intermediate position if the accelerator pedal 3 is in its rest position, and which does not allow the brake pedal 2 to return to its rest position until the accelerator pedal 3 has left its own rest position.

The link 4 comprises, for example, a finger 41 borne by the upper lever arm 32 of the accelerator pedal 3 and which extends parallel to the pivot X3 of the accelerator pedal 3.

When the accelerator pedal 3 is in its rest position under the effect of the associated spring, the finger 41 is urged in the direction indicated by the arrow S1 about the pivot X3 and therefore transmits to the lower lever arm 21 of the brake pedal 2 a torque directed in the opposite direction to the direction S1, the brake pedal 2 thus being moved slightly away from its rest position and being immediately operation as soon as it is actuated.

By contrast, as soon as the accelerator pedal 3 leaves its rest position under the effect of a force exerted by the driver on the pad 30, the finger 41 is urged in the opposite direction to the one indicated by the arrow S1, and allows the brake pedal 2 to return to its rest position.

As the figures show, the link 4 advantageously comprises a clevis 42 which is mounted on the lower lever arm 21 of the brake pedal 2, and against which the finger 41 of the accelerator pedal 3 rest when the accelerator pedal 3 is in its rest position.

A second link 5 may also be provided between the accelerator pedal 3 and the clutch pedal 1, to prevent these two pedals from being actuated simultaneously as far as their respective positions of maximum actuation or even close to these positions.

This second link 5 comprises, for example, a second finger 51 borne by the upper lever arm 12 of the clutch pedal 1 and which extends parallel to the pivot X1 of the clutch pedal 1.

When the clutch pedal 1 is depressed, the second finger 51 moves about the pivot X1 in the opposite direction to the direction S1.

Under these conditions, if the clutch pedal 1 reaches its position of maximum actuation when the accelerator pedal 3 is not in its rest position, the second finger 51 presses against the lower lever arm 31 of the accelerator pedal 3 and transmits to this lever arm a torque oriented in the first direction S1, which therefore returns the accelerator pedal 3 to its rest position.

Conversely, if the accelerator pedal 3 is depressed when the clutch pedal 1 is not in its rest position, the lower lever arm 31 of the accelerator pedal 3 encounters the second finger 51, which it causes to rotate about the pivot X1 in the direction S1, that is to say in the direction able to return the clutch pedal 1 to its rest position.

The invention claimed is:

1. A pedal box for a motor vehicle, comprising a clutch pedal (1), a brake pedal (2) and an accelerator pedal (3) that are mounted to respectively rotate about first, second and third pivots (X1, X2, X3) that are parallel to one another, said clutch pedal (1), brake pedal (2) and accelerator pedal (3) at each moment adopting either a rest position, or a position of maximum actuation, or an intermediate position somewhere between the rest position and the position of maximum actuation, and means for applying an elastic torque in a first direction of rotation (S1) to urge said clutch pedal (1) toward a first rest position, said brake pedal (2) toward a second rest position and accelerator pedal (3) toward a third rest position, characterized in that said means for applying said elastic torque comprises, a first link (4) located between said accelerator pedal (3) and the brake pedal (2) that places the brake pedal (2) in an intermediate position or said second rest position depending on whether or not the accelerator pedal (3) is in said third rest position, said brake pedal (2) having a lower lever arm (21) that extends between said second pivot (X2) and a brake pad (20), said accelerator pedal (3) having an lower lever arm (31) and an upper lever arm (32) that extend one on each side of said third pivot (X3), said lower lever arm (31) bearing an accelerator pad (30), and said first link (4) having a first finger (41) borne by said upper lever arm (32) of the accelerator pedal (3) that is parallel to the third pivot (X3) that transmits to said lower lever arm (31) of the brake pedal (2) a torque tat is directed in the opposite direction to the first direction (S1) when the accelerator pedal (3) is in said third rest position.

2. A pedal box according to claim 1, characterized in that the first link (4) comprises a clevis (42) mounted on the lower lever arm (21) of the brake pedal (2) and against which the first finger (41) of the accelerator pedal (3) rests when the accelerator pedal (3) is in said third rest position.

3. A pedal box according to claim 2, characterized by a second link (5) located between said accelerator pedal (3) and the clutch pedal (1) that prevents the accelerator (3) and clutch (1) pedals from simultaneously adopting respective positions of maximum actuation.

4. A pedal box according to claim 3, characterized in that the clutch pedal (1) comprises lower lever arm 11 and an upper lever arm 12 that extend one on each side of the first pivot (X1) with the lower lever arm (11) bearing a clutch pad (10), and in that the second link (5) comprises a second finger (51) borne by the upper lever arm (12) of the clutch pedal (1) that is parallel to the first pivot (X1), said second finger (51) transmitting to the lower lever arm (31) of the accelerator pedal (3) a torque directed in the first direction (S1), at least when the clutch pedal (1) reaches its position of maximum actuation when the accelerator pedal (3) is not in said third rest position.

* * * * *